US009221982B2

(12) United States Patent
Gross

(10) Patent No.: US 9,221,982 B2
(45) Date of Patent: Dec. 29, 2015

(54) MIXTURES, COMPOSITIONS, AND METHODS OF APPLYING MIXTURES AS COATINGS

(71) Applicant: Ray Gross, Wilder, ID (US)

(72) Inventor: Ray Gross, Wilder, ID (US)

( * ) Notice: Subject to any disclaimer, the term of this patent is extended or adjusted under 35 U.S.C. 154(b) by 0 days.

(21) Appl. No.: 14/461,893

(22) Filed: Aug. 18, 2014

(65) Prior Publication Data

US 2014/0349126 A1 Nov. 27, 2014

Related U.S. Application Data

(63) Continuation of application No. 13/131,237, filed as application No. PCT/US2009/065927 on Nov. 25, 2009, now Pat. No. 8,809,430.

(60) Provisional application No. 61/117,746, filed on Nov. 25, 2008.

(51) Int. Cl.

| | |
|---|---|
| ***B60C 13/00*** | (2006.01) |
| ***C08K 5/5419*** | (2006.01) |
| ***C09D 7/12*** | (2006.01) |
| ***C08K 5/10*** | (2006.01) |
| ***C08K 5/05*** | (2006.01) |
| ***C08K 5/06*** | (2006.01) |
| ***C08K 5/101*** | (2006.01) |
| ***B60C 1/00*** | (2006.01) |
| ***C09D 133/08*** | (2006.01) |
| ***C08K 5/12*** | (2006.01) |
| *C08K 5/00* | (2006.01) |

(52) U.S. Cl.

CPC ............ *C09D 7/1233* (2013.01); *B60C 1/0025* (2013.04); *B60C 13/00* (2013.01); *B60C 13/002* (2013.04); *C08K 5/00* (2013.01); *C08K 5/05* (2013.01); *C08K 5/06* (2013.01); *C08K 5/10* (2013.01); *C08K 5/101* (2013.01); *C08K 5/12* (2013.01); *C08K 5/5419* (2013.01); *C09D 133/08* (2013.01); *C08K 5/0008* (2013.01); *Y10T 428/31663* (2015.04)

(58) Field of Classification Search

CPC .. C09D 7/1233; C09D 133/08; C08K 5/5419; C08K 5/10; C08K 5/05; C08K 5/06; C08K 5/101; C08K 5/0008; C08K 5/00; C08K 5/12; Y10T 428/31663; B60C 1/0025; B60C 13/00; B60C 13/002

See application file for complete search history.

(56) References Cited

U.S. PATENT DOCUMENTS

| | | | | |
|---|---|---|---|---|
| 4,728,540 | A | 3/1988 | Gasman | |
| 5,216,057 | A | 6/1993 | Pratt et al. | |
| 5,656,680 | A | 8/1997 | Aguirre et al. | |
| 5,891,966 | A | 4/1999 | Murray et al. | |
| 2004/0109853 | A1 * | 6/2004 | McDaniel | 424/94.6 |
| 2006/0194907 | A1 | 8/2006 | Gottlieb | |

OTHER PUBLICATIONS

WO PCT/US09/065927 IPRP, May 31, 2011, Ray Gross.

WO PCT/US09/065927 Srch Rpt., Jul. 9, 2010, Ray Gross.

WO PCT/US09/065927 Wrtn Opn., Jul. 9, 2010, Ray Gross.

Easton, T. et al., "Waterborne silicone-organic hybrid coatings for exterior applications" J. Coat. Technol. Res. 2007, vol. 4, pp. 187-190.

Scalarone, Dominique et al., "Surface Monitoring of Surfactant Phase Separation and Stability in Waterborne Acrylic Coatings" Chem. Mater. 2007, vol. 19, pp. 6107-6113.

* cited by examiner

*Primary Examiner* — Kriellion Sanders

(74) *Attorney, Agent, or Firm* — Wells St. John P.S.

(57) ABSTRACT

Mixtures are provided that can include: latex polymer; antifoam; surfactant; plasticizer; ether; fungicide; glycol; and liquid stabilizer. Mixtures comprising: glycol; antioxidant; and defoamer. Compositions are provided that can include: a substrate; and a mixture over the substrate, the mixture comprising one or more of: latex polymer; antifoam; surfactant; plasticizer; ether; fungicide; glycol; liquid stabilizer; and antioxidant. Vehicle tires are provided. Plastic vehicle components are provided. Substrate treatment methods are provided that can include applying compositions to the substrate, the compositions comprising one or more of: latex polymer; antifoam; surfactant; plasticizer; ether; fungicide; glycol; liquid stabilizer; and antioxidant. Vehicle tire treatment methods are provided. Vehicle component treatment methods are provided.

12 Claims, 2 Drawing Sheets

10
16
20
22
24
14
18
12

MIXTURES, COMPOSITIONS, AND METHODS OF APPLYING MIXTURES AS COATINGS

CLAIM FOR PRIORITY

This application claims priority to U.S. provisional patent application Ser. No. 61/117,746 filed Nov. 25, 2008, entitled “Mixtures, Compositions, and Methods of Applying Mixtures as Coatings”, the entirety of which is hereby incorporated by reference.

RELATED PATENT DATA

This application is a continuation of U.S. patent application Ser. No. 13/131,237, now U.S. Pat. No. 8,809,430, which was filed on May 25, 2011, which is a35 U.S.C. §371 of and claims priority to PCT International Application Number PCT/US2009/065927, which was filed 25 Nov., 2009 (25.11.2009), and was published in English, which claims priority under 35 U.S.C. §119 to U.S. Provisional Patent Application No. 61/117,746 which was filed 25 Nov., 2008 (25.11.2008) the entirety of each of which are incorporated herein by reference.

TECHNICAL FIELD

The present disclosure relates to mixtures, compositions, and methods of applying mixtures as coatings. Particular embodiments of the disclosure provide tire coating mixtures and methods of applying same.

BACKGROUND

Many commercial coating products have been marketed for their substrate protection abilities. For example, products such as Armor All® and LORD Fusor® tire shield have been marketed for their ability to be used as a coating for substrates such as tires in the automobile industry. These products have been advertised for their ability to maintain the appealing appearance of substrates as well as protect the substrates from natural degradation such as UV radiation degradation and/or weather degradation.

SUMMARY

Mixtures are provided that can include: latex polymer; antifoam; surfactant; plasticizer; ether; fungicide; glycol; and liquid stabilizer. Mixtures comprising: glycol; antioxidant; and defoamer.

Compositions are provided that can include: a substrate; and a mixture over the substrate, the mixture comprising one or more of: latex polymer; antifoam; surfactant; plasticizer; ether; fungicide; glycol; liquid stabilizer; and antioxidant.

Vehicle tires are provided that can include at least one sidewall having a mixture thereon, with the mixture comprising one or more of: latex polymer; antifoam; surfactant; plasticizer; ether; fungicide; glycol; liquid stabilizer; and antioxidant.

Plastic vehicle components are provided that can have a mixture thereon, the mixture comprising one or more of: latex polymer; antifoam; surfactant; plasticizer; ether; fungicide; glycol; liquid stabilizer; and antioxidant.

Substrate treatment methods are provided that can include applying compositions to the substrate, the compositions comprising one or more of: latex polymer; antifoam; surfactant; plasticizer; ether; fungicide; glycol; liquid stabilizer; and antioxidant.

Vehicle tire treatment methods are provided that can include applying a mixture to the tire, the mixture comprising one or more of: latex polymer; antifoam; surfactant; plasticizer; ether; fungicide; glycol; liquid stabilizer; and antioxidant.

Vehicle component treatment methods are provided that can include applying a mixture to the component, with the mixture comprising one or more of: latex polymer; antifoam; surfactant; plasticizer; ether; fungicide; glycol; liquid stabilizer; and antioxidant.

BRIEF DESCRIPTION OF THE DRAWINGS

Preferred embodiments of the disclosure are described below with reference to the following accompanying drawings.

DESCRIPTION

Figure 1:
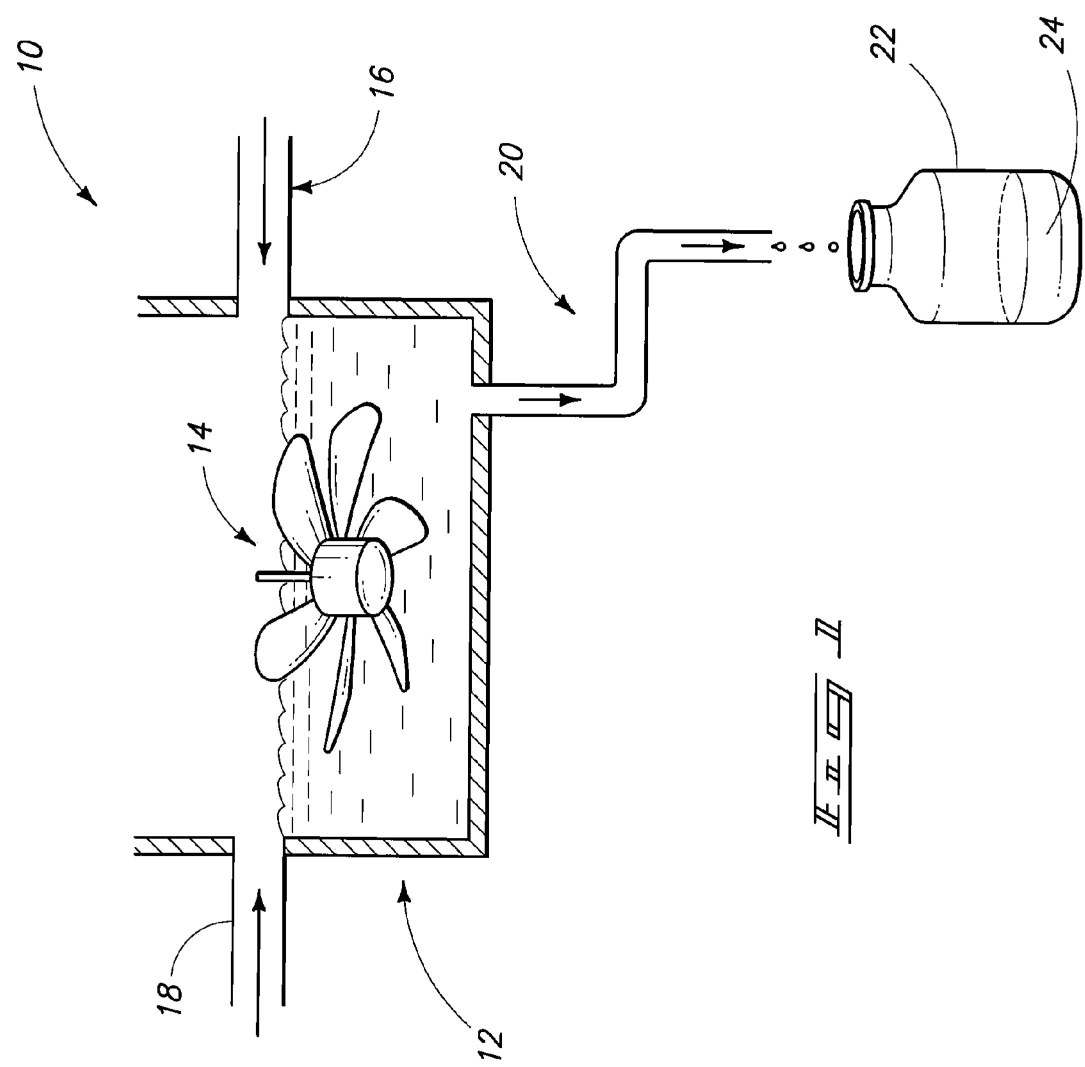
FIG. 1 is a system for preparing a coating material according to an embodiment.

The present disclosure provides compositions as well as methods for manufacturing compositions and methods for treating substrates that are described with reference to FIGS. 1 and 2. Referring to FIG. 1, system 10 is depicted that includes a vessel 12 having mixing apparatus 14 therein. Vessel 12 can be in fluid communication with intake conduits 16 and 18 as well as exit conduit 10. These conduits can be configured to include valves that provide metered intake or exit of their contents from the interior of vessel 12. For example, the valves can be needle valves and/or electronically controlled valves. From vessel 12 via conduit 20, a product receiving reservoir 22 can be included in system 10. Product receiving reservoir 22 can include product 24, for example.

Product receiving reservoir 22 can take the form of a spray bottle and, as such, can include a spray application device. Reservoir 22 can alternatively include a desorption foam applicator, for example.

Referring to table 1 below, product 24 as prepared within vessel 12 can include an acrylic latex polymer such as NeoCryl XK-220®, available from DSM NeoResins, 730 Main Street, Wilmington, Mass. 01887, USA, telephone number 1-800-225-0947. Product 24 can also include an antifoam material such as SAG 10, available from GE Silicones (csna.silicones@momentive.com). Product 24 can further include a fluorosurfactant such as Zonyl® FSN available from DuPont™ (telephone number 1-302-774-1000). Product 24 may also include a plasticizer such as Dibutyl Phthalate, and an ether such as Glycol Ether DPM and/or Glycol Ether EB, both of which are available from Dow Chemical Company (telephone number 1-800-447-4369). Product 24 can also include a fungicide such as Polyphase 663, available from Troy Corporation (8 Vreeland Road, P.O. Box 995, Florham Park, N.J. 07932, telephone number 1-909-867-3294). Product 24 may also include a glycol such as Propylene glycol. Product 24 may also include a liquid stabilizer such as TINUVIN 5151, at a 50% level in an ester alcohol such as Texanol. TINUVIN 5151 is available from Ciba Corporation (4090 Premier Drive, High Point, N.C. 27265, telephone number 1-336-801-2327). Texanol is available from Eastman Chemical Company (P.O. Box 431, Kingsport, Tenn. 37662, telephone number 1-423-229-2000).

Referring to Table 1 below the above referenced materials may be incorporated into product 24 in the % (wt./wt.) ranges listed with a particular embodiment of product 24 having the specific % (wt./wt.) amounts shown.

TABLE 1

| Ingredient | lbs | % (wt./wt.) | lbs | % (wt./wt.) |
|---|---|---|---|---|
| NeoCryl XK-220 | 777-857 | 83-92 | 817.1 | 83.2 |
| SAG 10 | 0.80-0.92 | 0.09-0.1 | 0.86 | 0.1 |
| Zonyl FSN | 0.70-0.80 | 0.07-0.1 | 0.75 | 0.1 |
| Dibutyl Phthalate | 12.0-15.0 | 1.3-1.6 | 13.16 | 1.3 |
| Glycol Ether DPM | 44-52 | 4.7-5.6 | 47.5 | 4.8 |
| Glycol Ether EB | 49-53 | 5.2-5.7 | 52.6 | 5.4 |
| Polyphase 663 | 3.2-4.0 | 0.3-0.4 | 3.6 | 0.4 |
| Propylene glycol | 20-30 | 2.1-3.2 | 25.0 | 2.5 |
| TINUVIN 5151 | 21-24 | 2.2-2.6 | 22.0 | 2.2 |
| (50% in Texanol) | | | | |
| Total = | 934.9-1036.72 | | 982.6 | 100.0 |

In accordance with another embodiment, the composition can include a glycol such as propylene glycol. The composition can further include an antioxidant such as Irganox 1135, (Ciba Corporation 205 South James Street Newport 19804-2424 Del., USA) as well as one or more defoamers such as Byk 019 and/or Byk 025, both products of BYK USA Inc. 524 South Cherry Street Wallingford, Conn. 06492-4453 United States of America. The composition can include a mixture phenolic primary antioxidants, such as benzenepropanoic acids, including but not limited to 3,5-bis(1,1-dimethylethyl)-4-hydroxy-acids that can be esters with C7 to C9 branching.

The composition can also include silicone defoamers that can include polyether polysiloxanes in or as well as dipropyleneglycolmonomers. The defoamer can include a solution of polyether modified polydimethylsiloxanes, for example. With regard to particular implementations, the defoamer can include dipropylene glycolmonomethylether(s). In accordance with the above and/or other embodiments, the defoamer can include a solution of polysiloxanes and alcohols and/or tallow, either or both of which can be ethoxylated.

TABLE 2

| Ingredient | lbs | Density (lbs/gal) | Gallons |
|---|---|---|---|
| Propylene Glycol | 75 (±10%) | 8.64 | 8.68 |
| Irganox | 2.0 (±10%) | 8.3 | 0.24 |
| Byk 019 | 3.0 (±10%) | 8.16 | 0.37 |
| Byk 019 | 3.0 (±10%) | 8.16 | 0.037 |

Figure 2:
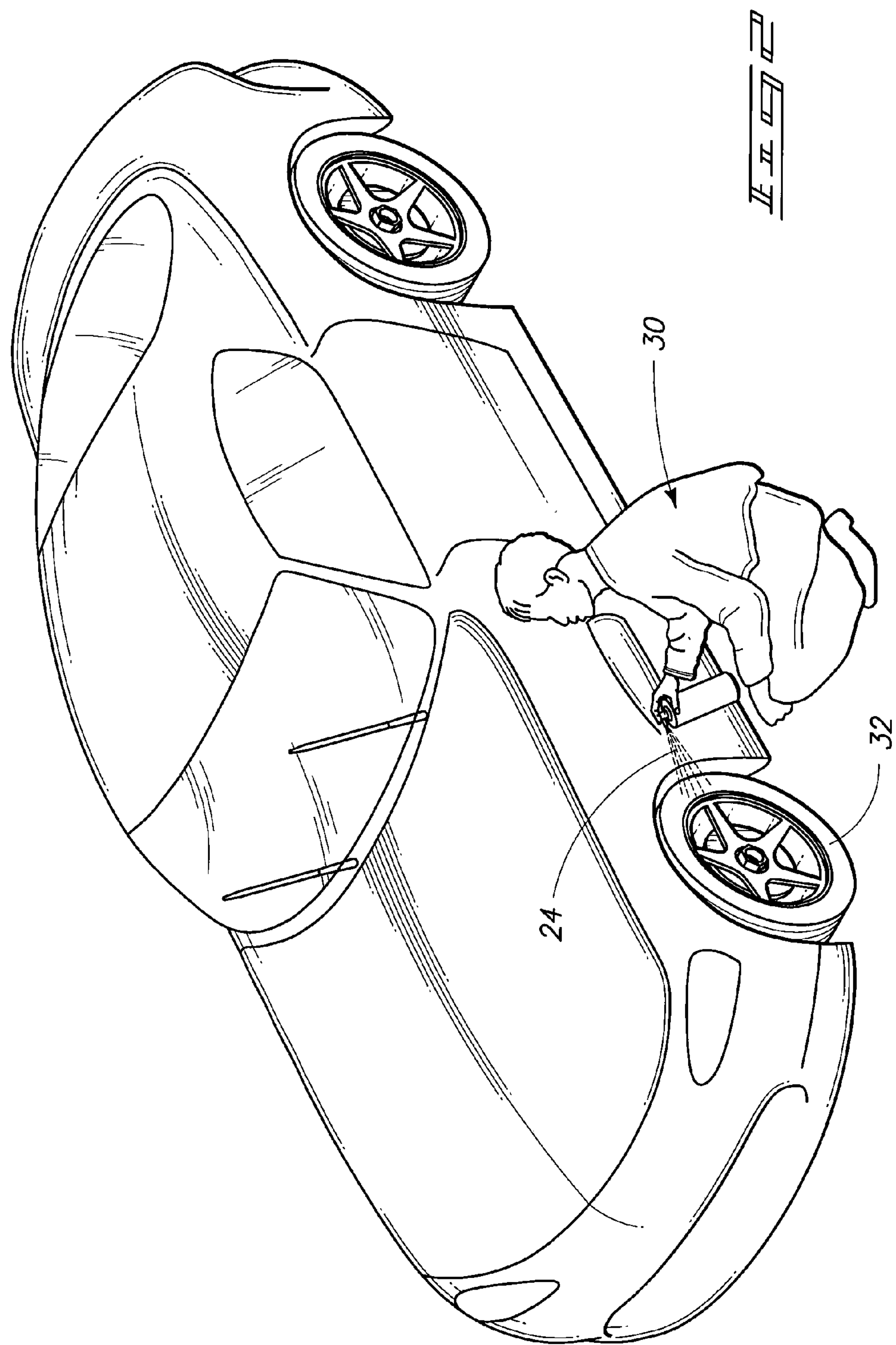
FIG. 2 is a depiction of a step of application of coating material according to an embodiment.

Referring to FIG. 2, a user 30 can apply product 24 to a substrate such as 32 to create a coated substrate 32. Product 24 has a density sufficient to allow for application via a spray bottle. Further product 24 can be applied via a desorbing foam applicator as well. Product 24 can also be dispensed from a bottle and applied directly to a substrate with or without the aid of an application device. Application devices can include towels, for example.

As an example, the coated substrate 32 can have enhanced substrate protection capabilities. For example, while demonstrated in FIG. 2 that the substrate is a tire, such as a vehicle tire including but not limited to automobile tires, the substrate can also be plastic, vinyl, wood, brick, stone, sand, metal, canvas, cloth, and/or leather, for example. The substrate can be a thermoplastic or elastomer.

The substrate can be a natural rubber such as a vulcanized rubber. The substrate can also include additives such as carbon black for example. The substrate can also include a synthetic rubber. Hydrocarbon polymers can be the basis of the substrate, such as polymers of isoprene, for example. The substrate can be a latex and have a molecular weight of from about 100,000 to about 1,000,000 atomic mass units. Typically, a small percent (up to 5% of dry mass) of other materials, such as proteins, fatty acids, resins, and/or inorganic materials (salts) may be present.

In accordance with particular embodiments, the substrate can be the plastic of an automobile as well, such as the plastic utilized for automobile bumpers for example. These bumpers can be comprised of thermoplastic olefins (TPOs), polycarbonates, polyesters, polypropylene, polyurethanes, polyamides, or blends of these with, for instance, glass fibers, for strength and structural rigidity, for example. These plastic components can include one or more coatings. For example, the component can include an adhesion promoter, a primer coat, a base coat, and/or a clear coat. The adhesion promoter can include chlorinated polyolefin (CPO). The primer, base, and/or clear coats may have been applied electronically.

According to example implementations, upon application of product 24 to substrate 32, the appearance of substrate 32 can have a sheen or wet look that can be consistent with the look of new tires, for example. According to other implementations, application of product 24 to substrate 32 can provide this look and protection for as long as six months. According to other implementations, the providing of material 24 to substrate 32 can provide ultraviolet ray protection to block damaging sun rays from substrate 32, thereby enhancing the product lifetime of substrate 32. Furthermore, when material 24 is applied to substrate 32 such as tires, the material does not collect brake or dirt dust like other tire shine products. According to example implementations, material 24 is a clear coat and has superior adhesion qualities to substrate 32.

In accordance with additional implementations, product 24 applied to substrate 32 can decrease the adherence of road grime to automobile components. For example, substrate 32, such as an automobile bumper, having product 24 applied thereto can be less adherent to road dirt and/or mud. According to example implementations, product 24 can prevent automobiles from requiring frequent cleanings which can extend the life of the automobile's original paint and/or coating.

The invention claimed is:

1. A substrate treatment method comprising applying a mixture to the substrate, the mixture comprising:
polyether polysiloxane;
alkyl phthalate;
glycol ether; and
propylene glycol.

2. The treatment method of claim 1 wherein the alkyl phthalate comprises from about 1.3 to about 1.6%(wt./wt.) of the mixture.

3. The treatment method of claim 1 the ether comprises from about 4.7 to about 5.7%(wt./wt.) of the mixture.

4. The treatment method of claim 1 wherein the propylene glycol comprises from about 2.1 to about 3.2%(wt./wt.) of the mixture.

5. A vehicle tire treatment method comprising applying a mixture to the tire, the mixture comprising:
polyether polysiloxane;
alkyl phthalate;
glycol ether; and
propylene glycol.

6. The treatment method of claim 5 wherein the alkyl phthalate comprises from about 1.3 to about 1.6%(wt./wt.) of the mixture.

7. The treatment method of claim 5 wherein the ether comprises from about 4.7 to about 5.7%(wt./wt.) of the mixture.

8. The treatment method of claim 5 wherein the propylene glycol comprises from about 2.1 to about 3.2%(wt./wt.) of the mixture.

9. A vehicle component treatment method, the method comprising applying a mixture to the component, the mixture comprising:

polyether polysiloxane;
alkyl phthalate;
glycol ether; and
propylene glycol.

10. The treatment method of claim 9 the alkyl phthalate comprises from about 1.3 to about 1.6%(wt./wt.) of the mixture.

11. The treatment method of claim 9 wherein the ether comprises from about 4.7 to about 5.7%(wt./wt.) of the mixture.

12. The treatment method of claim 9 wherein the propylene glycol comprises from about 2.1 to about 3.2%(wt./wt.) of the mixture.

* * * * *